United States Patent [19]

Buzano

[11] E Re. 28,482

[45] Reissued July 15, 1975

[54] NOVEL HIGH-BULK YARN

[75] Inventor: Michel Buzano, Villeurbanne, Rhone, France

[73] Assignee: Rhone-Poulenc - Textile S.A., Paris, France

[22] Filed: Apr. 22, 1974

[21] Appl. No.: 463,139

Related U.S. Patent Documents

Reissue of:

[64] Patent No.: 3,763,643
Issued: Oct. 9, 1973
Appl. No.: 89,512
Filed: Nov. 13, 1970

U.S. Applications:

[62] Division of Ser. No. 807,540, March 17, 1969, Pat. No. 3,678,549.

[30] Foreign Application Priority Data

Mar. 18, 1968 France ..... 68.144240

[52] U.S. Cl. ..... 57/140 J; 57/140 BY
[51] Int. Cl. ..... D02g 3/24; D02g 3/34
[58] Field of Search..... 57/140 R, 140 J, 157 F, 57/34 B; 28/1.4, 72.12

[56] References Cited

UNITED STATES PATENTS

| | | | |
|---|---|---|---|
| 3,110,151 | 11/1963 | Bunting, Jr. et al. | 28/1.4 X |
| 3,118,269 | 1/1964 | Bilsky | 28/1.4 X |
| 3,286,321 | 11/1966 | Fletcher et al. | 28/1.4 X |
| 3,426,406 | 2/1969 | McCutchan, Jr. | 28/1.4 |
| 3,433,007 | 3/1969 | Myers | 28/1.4 X |

*Primary Examiner*—John Petrakes
*Attorney, Agent, or Firm*—Cushman, Darby & Cushman

[57] ABSTRACT

A high-bulk yarn having interlaced filaments substantially free from loops, and preferably having spherical knops affecting the yarn as a whole, is made by subjecting a continuous filament (or less preferably a staple fibre) yarn to the action of a turbulent fluid in a suitable nozzle, into which the yarn is fed non-axially so that it rubs against one wall thereof. If desired more than one yarn can be employed, making a single composite yarn. The invention includes also a nozzle, preferably having its yarn input opening flared to provide for the necessary friction of the yarn against the side of the nozzle.

1 Claim, 4 Drawing Figures

NOVEL HIGH-BULK YARN

Matter enclosed in heavy brackets [ ] appears in the original patent but forms no part of this reissue specification; matter printed in italics indicates the additions made by reissue.

---

This application is a division of my co-pending application Ser. No. 807,540, filed Mar. 17, 1969, no U.S. Pat. No. 3,678,549.

This invention relates to a novel high-bulk yarn, and to a method and device for making it.

Some yarns are rendered bulky by separating, or putting in a dishevelled or "tousled" state, the filaments of which they consist. This can be done by mechanical means, but preferably pneumatic means are used which make it possible to open and separate the filaments and even to impart a certain number of convolutions to them, so binding them in a yarn. For this purpose, a substantially untwisted bundle of continuous filaments is introduced into a zone in which they are acted on by a turbulent fluid. Thus it has been proposed to cause the filament bundle to travel in two conduits which are offset relatively to each other, and subject it to the action of the jet of fluid during its travel in the second conduit.

This type of process produces a high-bulk yarn, but does not give a fancy effect such as that found on the knop yarns produced by conventional mechanical means.

The present invention provides a novel high-bulk yarn the filaments of which are interlaced in such manner as to be substantially free from loops and other visible convolutions, and which may if desired comprise neps of substantially spherical shape, affecting the filaments as a whole.

The invention may be applied to yarns of any natural, artificial or synthetic material, preferably comprising, wholly or partially, continuous filaments.

According to the invention the high-bulk yarn is made by a process in which at least one yarn is caused to travel through the fluid turbulence chamber of a nozzle from which it is freely drawn away in the same direction as the fluid, and into which it is fed non-axially so that it rubs at least slightly on the wall of the nozzle.

It is found that a slight degree of friction of the yarn at the inlet of the nozzle or jet makes it possible to eliminate the undesired effects produced by small quantities of fluid which may, despite all efforts to the contrary, succeed in escaping upstream.

The desired friction effect can be obtained by introducing the yarn, or at least one of the yarns if more than one is used, into the turbulence chamber at an angle substantially perpendicular to the longitudinal axis of the travel path of the yarn in the chamber.

When two or more yarns are fed into the turbulence chamber, they may be fed continuously or intermittently at identical or different velocities and at identical or different angles, no correlation being imposed a priori between the withdrawal velocities and the angles of introduction of the yarns into the nozzle.

The yarn obtained may be withdrawn out of the nozzle either continuously or intermittently, but generally the latter affords no advantage.

The yarn or yarns may be introduced into the nozzle in the tensioned state or while they are substantially free from tension.

If desired the yarn may simultaneously be subjected to thermal treatment, notably in the case of yarn whose bulk can be increased by such treatment.

Generally, continuous filament yarns are utilised, but it is possible to feed, into the turbulence chamber, simultaneously with at least one yarn consisting of continuous filaments, at least one spun (staple fibre) yarn. Indeed it is even possible to feed into the turbulence chamber one or more spun yarns only.

The process may be carried into effect with the aid of a nozzle or jet which also forms a part of the invention, and which comprises a cylindrical conduit for the yarn having an upstream portion of reduced section and a downstream portion of larger section, without a connecting zone, and a fluid feed conduit debouching into the yarn conduit and forming an acute angle with the longitudinal axis of the nozzle.

Advantageously, the fluid feed conduit debouches into the upstream portion of the axial conduit of larger cross-section, making a small angle with the longitudinal axis of the nozzle so that the fluid is fed substantially in the same direction as the yarn.

According to a preferred form of the invention, the conduit of larger cross-section terminates downstream in a substantially cylindrical portion of smaller diameter.

The device for the performance of the invention comprises in addition means for feeding, guiding and withdrawing the yarn.

The means for the feed or delivery and withdrawal of the yarn may if desired be actuated intermittently, for example by means of a device for varying the travel path of the yarn.

The invention will now be more particularly described by reference to the accompanying drawing, in which.

Figure 1:
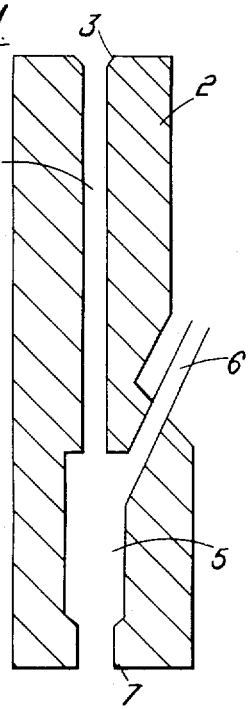
FIG. 1 is a diagrammatic view of a nozzle.

Referring now to the drawings, the nozzle or jet 1 is constituted by a body 2 having an axial passage for the yarn or yarns, formed by a slightly flared input aperture 3 and a narrow axial conduit 4 debouching into a widened portion 5 into which the fluid flows via conduit 6, and terminating in a short discharge section 7 of somewhat small diameter.

In the following examples there was used a nozzle of overall height 58.5 mm, the length of the narrow section 4 being 34 mm. and that of the wider section 5 being 19 mm., the corresponding diameters being 2 mm. and 5 mm. respectively.

The discharge portion 7 has a length of 5.5 mm. and an internal diameter of 3.8 mm. The conduit 6 has a diameter of 2 mm. and a length of 12 mm. and makes an angle of 25° with the longitudinal axis of the nozzle.

The nozzle is mounted in a device comprising, upstream (see FIG. 2), feed or delivery means constituted by two creels 8 and 9 carrying bobbins 10 and 11, pairs of feed or delivery rollers 12 and 13, 14 and 15 and guide means such as guides 16 and 17, all arranged to feed the yarns to the nozzle in such a way as to cause them to rub against the flared portion 3; downstream there is a conventional winding-up means, shown as a system comprising a spindle 18, ring 19 and traveller 20.

Figure 3:
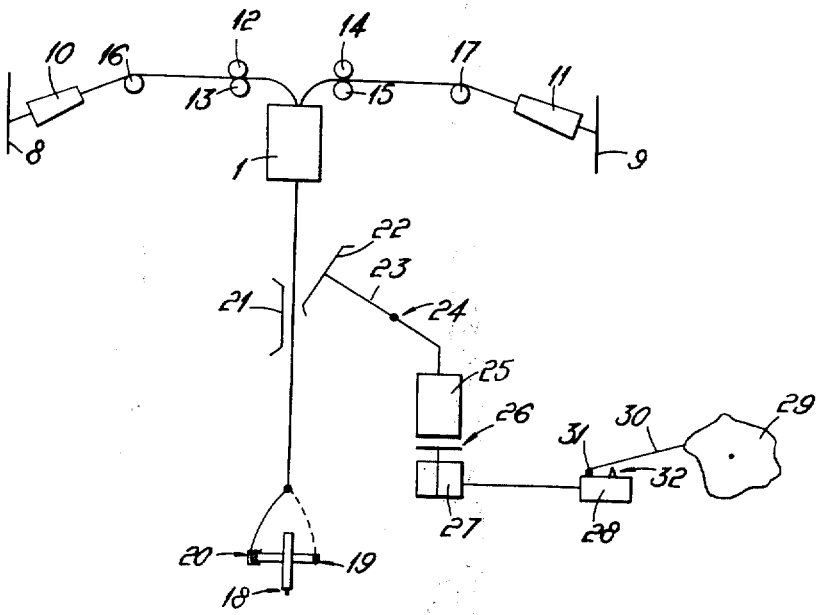

In the varient of FIG. 3, the device further comprises means for intermittent withdrawal disposed between the nozzle 1 and the winding-up system. While any such means can be used, there is illustrated a system comprising a fixed plate 21 against which bears, intermittently, a moving plate 22 carried by an arm 23 mounted for movement on a fixed pivot 24 and provided at its other end with a counterweight 25 bearing on a plate 26 to which upward movement is imparted by pulses supplied by an electromagnet 27 which is intermittently excited by means of a microswitch 28 controlled by a variable-profile cam 29 through an arm 30 arranged to be mobile about a pivot 31 and adapted to make contact with a contact 32.

Of course, a device of this kind could be replaced by any other analogous system, for example a tie rod and crank device controlled by a variable-speed motor.

Figure 4:
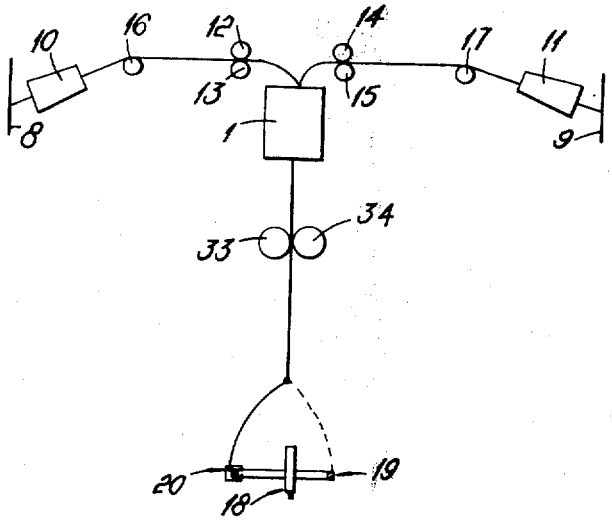

In a further variant, illustrated in FIG. 4, the intermediate withdrawal system is replaced by a relaxation device constitution simply by a set of rollers 33 and 34 disposed between the nozzle 1 and the winding-up device.

EXAMPLE 1

Figure 2:
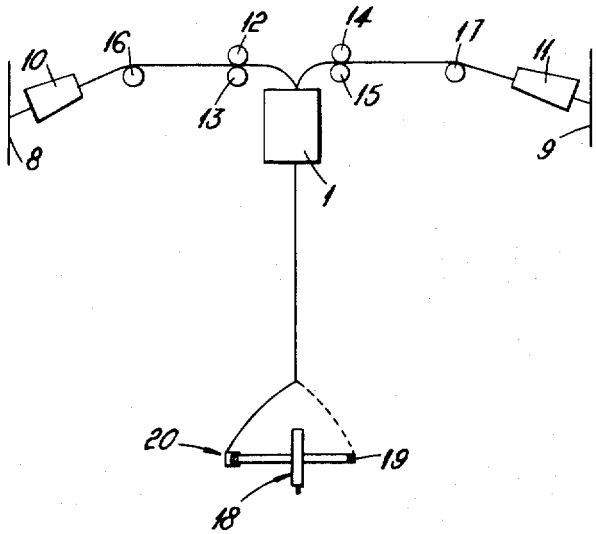
FIGS. 2 to 4 show various appropriate assemblies of nozzle and feed, withdrawal and guide means.

Using the device shown in FIG. 2, i.e. without intermittent withdrawal of the yarn, two polyhexamethylene adipamide 70 denier/23 ply yarns are fed to the nozzle simultaneously, one at a velocity of 27 m/min. and the other at a velocity of 72 m/min. the nozzle being fed with air under a pressure of 4 kg/cm$^2$.

The yarn obtained exhibits irregularly spaced loops affording an extremely small amount of sliding action.

EXAMPLE 2

Using the device shown in FIG. 3 and employing intermittent withdrawal, there are fed simultaneously, at the same velocity of 60 m/min., a polyhexamethylene adipamide 70 denier/23 ply yarn and a cellulose acetate 150 denier/36 ply effect yarn, the nozzle being fed with air under a pressure of 4 kg/cm$^2$.

The number of short pulses imparted to the yarn is between 12 and 15 per minute, the speed of rotation of the winding-up spindle being 5,000 rpm.

A high-bulk, crinkly, knop yarn is obtained, the number of knops being directly connected with the number of pulses.

EXAMPLE 3

With the device illustrated in FIG. 4, there are fed into the nozzle 1, simultaneously and at the same velocity of 80 m/min., a polyethylene terephthalate 130 denier/44 ply yarn and a polyhexamethylene adipamide 70 denier/33 ply yarn; the yarn produced is withdrawn at a velocity of 56 m/min., giving a degree of relaxation of 30 percent.

In this way there is obtained a knop yarn having randomly disposed spherical loops.

I claim:

1. High bulk yarn made of synthetic or artificial material having interlaced filaments which individually are substantially free from loops and other convolutions, the said yarn comprising randomly spaced knops of substantially spherical shape formed by loops in the yarn as a whole.

* * * * *